United States Patent [19]
Ogawa

[11] 3,917,395
[45] Nov. 4, 1975

[54] CONTROL CIRCUIT FOR PHOTOGRAPHIC APPARATUS

[75] Inventor: Francis T. Ogawa, Lakewood, Colo.
[73] Assignee: Honeywell Inc., Minneapolis, Minn.
[22] Filed: June 28, 1973
[21] Appl. No.: 374,691

[52] U.S. Cl. ................. 354/23 D; 354/34; 354/51; 354/60 R; 354/145; 354/149; 354/195
[51] Int. Cl.² .. G03B 7/08; G03B 3/00; G03B 15/05
[58] Field of Search .......... 95/10 CE, 10 CT, 44 R, 95/53 EA; 354/33, 34, 50, 51, 195, 60, 25, 32, 23 D, 145, 149

[56] References Cited
UNITED STATES PATENTS
3,659,509  5/1972  Burgarella ............................ 354/33
3,744,385  7/1973  Burgarella et al. ................... 354/60

Primary Examiner—Joseph F. Peters, Jr.
Attorney, Agent, or Firm—Arthur H. Swanson; Lockwood D. Burton

[57] ABSTRACT

An automatic photographic camera, which features automatic focusing, automatic exposure control, automatic flash operation and automatic film advance and shutter cocking, includes an electronic control circuit. The electronic control circuit includes a binary logic circuit which is responsive to a number of parametric signals to effect a control of the timing and actuation of the several automatic functions of the camera.

6 Claims, 4 Drawing Figures

CONTROL CIRCUIT FOR PHOTOGRAPHIC APPARATUS

CROSS REFERENCE TO RELATED APPLICATION

Subject matter disclosed but not claimed herein is described and claimed in a copending application of Dean M. Peterson for Photographic Apparatus filed on even date herewith. That Peterson application was subsequently abandoned and refiled as application Ser. No. 453,888 on Mar. 22, 1974.

BACKGROUND OF THE INVENTION

1. Field of the Invention

The present invention relates to photographic apparatus. More particularly, it relates to automatic control circuitry for an automatic camera.

2. Description of the Prior Art

Heretofore many structures have been devised for providing what are called automatic camera operations. Some of these have included automatic exposure control systems which feature control either of the time of exposure or the iris opening of the camera, or both. Others have shown means for effecting an automatic focus in a cmaera but not related to the automatic exposure control. Some cameras have provided means for indicating that an insufficient ambient light was available for a proper exposure of the film. Such means however, were merely indicators and did not effect a control function within the camera. Some camera included a built in electronic flash unit. These however, required a selection by the operator of the camera prior to the taking of the picture to effect an operation of the flash unit.

SUMMARY OF THE INVENTION

In the above referenced copending application of Dean M. Peterson a fully automatic camera is provided which teaches means for effecting an automatic focus of the optical system of the camera, means for effecting an automatic control for the exposure of the film in the camera to a predetermined amount of light (the control being effected by controlling both the aperture and the shutter opening time). That camera also includes a built in electronic flash unit which is automatically operative whenever insufficient ambient light is available to effect a proper exposure of the film in the camera.

It is an object of the present invention to provide an electronic control circuit for an automatic camera of the type set forth in the aforementioned copending application. It is another object of the present invention to provide an improved electronic control circuit for controlling timing and coordinating the operation of a number of automatic features of an automatic camera.

It is yet another object of the present invention to provide an automatic control circuit for an automatic camera which circuit features binary logic control circuitry.

In accomplishing these and other objects, there has been provided, in accordance with the present invention, a control circuit for an automatic photographic camera which features a binary logic control system connected to respond to each of several input parameters developed by appropriate sensors built into the camera for programming and controlling the sequence of a plurality of automatic operations within the camera. For example, when a film cartridge is loaded into the camera and a compartment door of the film cartridge chamber is closed the film in the cartridge is automatically advanced to the first film frame position by the energization in one direction of a reversible electric motor. Simultaneously, a built in electronic flash unit is charged in readiness for use if needed in the subsequent taking of a picture. When the operator of the camera aims the camera at a chosen object and actuates the shutter release mechanism to initiate the picture taking process, an automatic focus system is energized to automatically adjust the lens system of the camera to bring the object of the photograph into focus on a film plane. Through the logic control system, other features of the camera operation are blocked until such time as the focussing of the camera has been accomplished. Upon completion of the focus adjustment, the shutter of the camera is allowed to begin to open to admit light into the film chamber of the camera. Means are provided for sensing the amount of light so admitted through the shutter opening and to provide a first and a second control signal. The first control signal is in the nature of a sampling of the ambient light at a time near the beginning of the opening of the shutter to determine if there is sufficient light for the proper exposure of the film in the camera. If insufficient light is available, the logic control circuit responds to the sampling to provide, at a proper time in the opening phase of the shutter, to trigger the operation of the electronic flash unit. If, on the other hand, adequate light is indicated by the sampling, a signal is applied through the logic control circuit to block the actuation of the electronic flash unit. The second control signal is an indication that enough light has been admitted through the opening of the shutter to properly expose the film in the camera. That control signal is also applied through the logic circuit to effect a closure of the shutter. Following the completion of the closure of the shutter the motor is automatically actuated to advance the film in the camera to the next film frame position and at the same time to reset the shutter mechanism in readiness for a subsequent picture. Again simultaneously, the electronic flash unit is recharged for a subsequent use.

BRIEF DESCRIPTION OF THE DRAWING

A better understanding of the present invention may be had from the following detailed description when read in connection with the accompanying drawings, in which.

THE DETAILED DESCRIPTION OF THE PREFERRED EMBODIMENT

Figure 1:
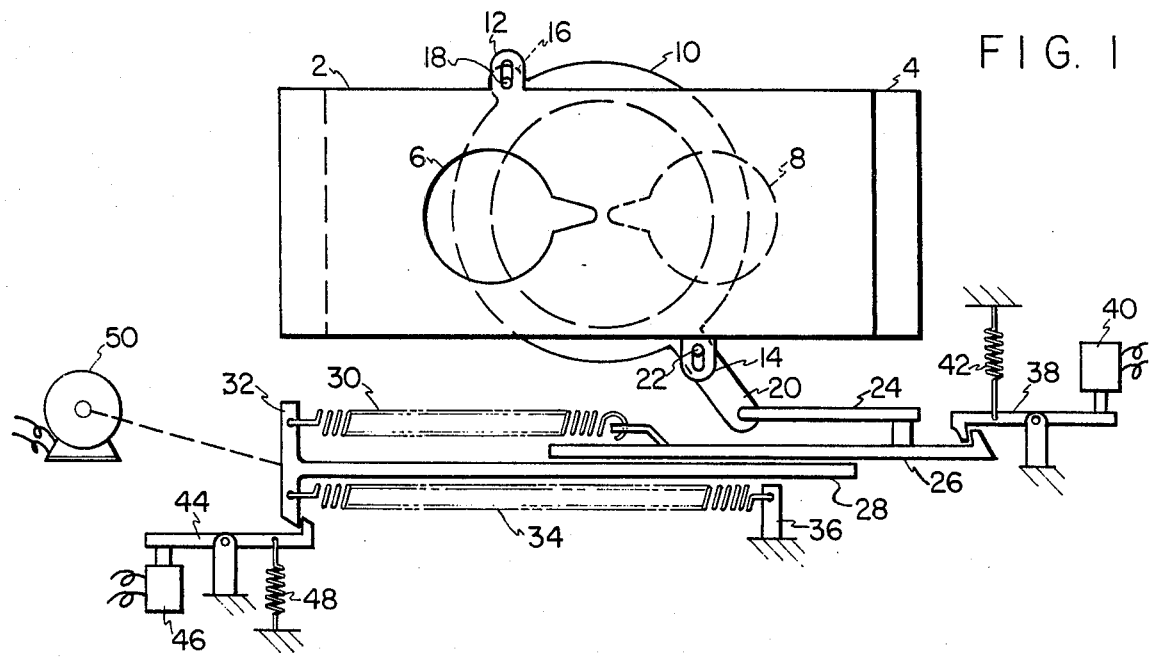
FIG. 1 is a schematic representation of a shutter mechanism for a camera suitable for use in connection with the presen invention.

In FIG. 1 there is illustrated a shutter mechanism basically of the same type as that shown in the aforementioned copending Peterson application. The shutter comprises a first shutter blade 2 and a second shutter blade 4. The two shutter blades are constrained to oppositely directed translational motion. Each of the shutter blades has a configured opening 6, and 8, respectively, comprised essentially of a circular opening and having a substantially triangular radial extension protruding therefrom. In the shutter closed position, as shown in FIG. 1, it may be seen that the two openings completely out of alignment with each other, blocking the admittance of light into the camera chamber. A complementary driving member 10 in the form of an annulus or ring is coupled to the two shutter blades 2 and 4, respectively. The shutter blade 2 includes a tab 12 extending from the edge thereof. A similar tab 14 extends from the lower edge of blade 4. The ring 10 has a radial tab 16 which carries a driving pin 18. Pin 18 extends through a slot in the tab 12 to couple the driving ring 10 to the first blade 2. Diametrically opposite from the radial tab 16 is a tang 20 extending from the periphery of the ring 10. The tang 20 carries a pin 22 which, in turn, extends through a slot in the tab 14 of the blade 4 to couple the blade 4 to the ring 10. At the other extremity of the tang 20, there is coupled a driving link 24. The driving link 24 is carried by a first driving plate 26 of a shutter driving mechanism. Also included in the shutter driving mechanism is a second driving plate 28. A first spring 30 is coupled between the first driving plate 26 and a shoulder or boss 32 of the second driving plate 28. A second spring 34 is connected between the boss 32 on the second driving plate 28 and a fixed reference point 36. The spring 30 is arranged to bias the first driving plate 26 toward the left, as shown in the illustrative embodiment. A latch member 38 engages the driving plate 26 to restrain it against the urging of the spring 30. In the structure illustrated in FIG. 1 the latch 38 is kept in engagement with the plate 26 by the energization of a magnet 40. Deenergization of the magnet 40 allows the latch 38 to be disengaged from the plate 26 by the force of a spring 42. Similarly, the second driving plate 28 is restrained against the urging of the spring 34 by a latch 44. The latch 44 is held in engagement with the plate 28 by the energization of a magnet 46. Deenergization of the magnet 46 allows the latch 44 to be disengaged from the plate 28 by operation of the force of a spring 48.

In the process of operating the camera, when the latch 38 is released by the deenergization of the magnet 40, the drive plate 26 begins to move, under the urging of the spring 30, toward the left, as shown in the illustrative embodiment. Since the ring 10 is constrained to move in a rotational direction about a virtual axis, concentric with the optical axis of the camera, the movement of the drive plate 26 causes the ring 10 to be rotated in a clockwise direction about its axis. The movement of the ring, in turn, causes the two shutter blades to be moved in oppositely directed translational motion such that the openings in the two shutter blades move toward each other in an overlapping relationship to produce a progressively larger aperture window through which light is admitted to the chamber of the camera. When sufficient light has been admitted for a proper exposure of the film in the camera, as will be hereinafter shown, the magnet 46 is deenergized releasing the second driving plate 28 to be moved to the right under the urging of the spring 34. As the plate 28 moves to the right, it carries the first plate 26 with it to return that plate to its original position as shown in FIG. 1. The returning coupling between the plate 28 and the plate 26 may be a simple abutment such as a shoulder or boss 32 which would then engage the end of the plate 26 on the release of the latch 44. Returning the plate 26 to its original position restores the shutter blades to their closed position as shown in FIG. 1. A reversible electric motor 50 is provided which, upon energization for movement in one direction is operative to restore the second driving plate 28 to its original position, the position shown in FIG. 1. At the same time the motor 50 is operative to restore the second driving plate 28 to its original position, it is also operative through a coupling (not here shown) to advance a film in the camera to the next film frame position.

The mechanism thus far described and illustrated in FIG. 1 as well as the mechanism illustrated in FIG. 2 and to be hereinafter described is schematic in presentation for the purpose of illustrating the environment for the electronic control circuit constituting the present invention. The details of the mechanism is shown, described, and claimed in the aforementioned copending application of Dean Peterson.

Figure 2:
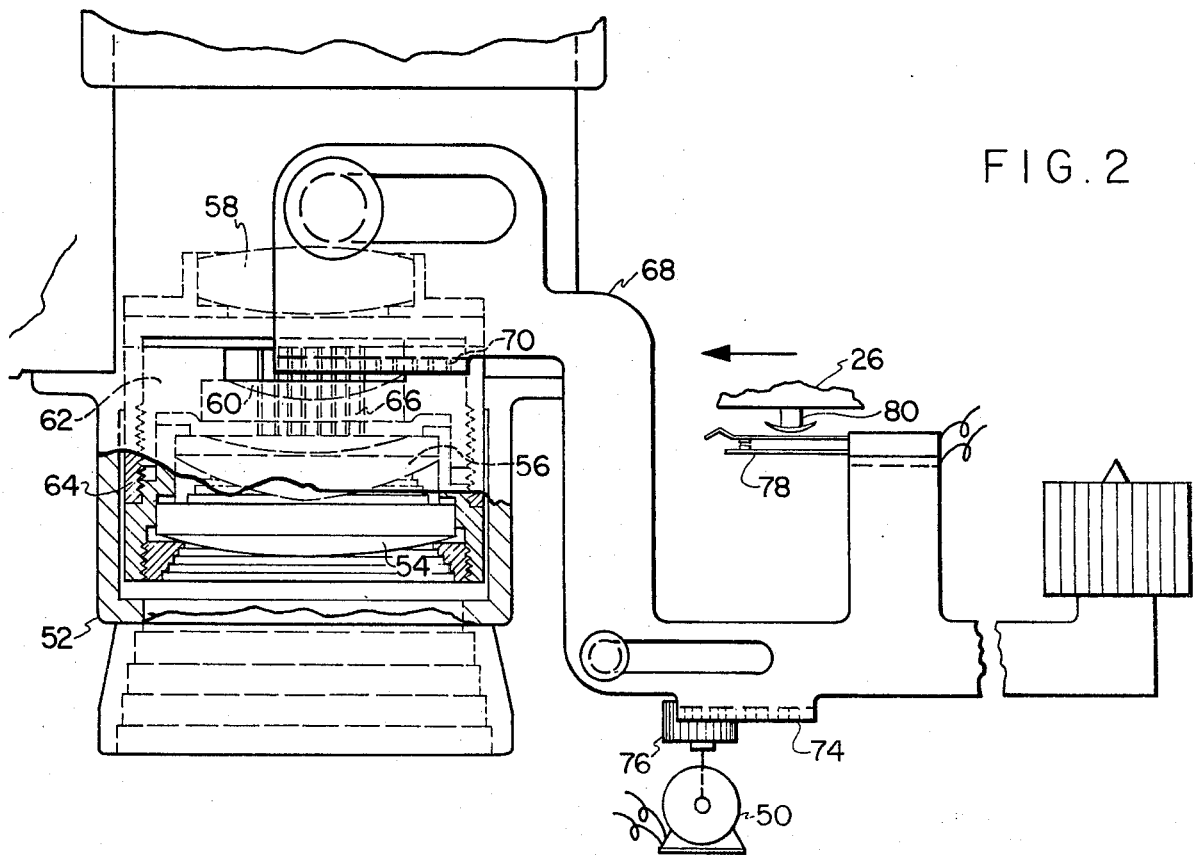
FIG. 2 is a schematic representation of an adjustable lens system for a camera embodying the present invention.

In FIG. 2 there is shown a schematic representation of a lens barrel 52 of a type suitable for use in conjunction with the present invention. Within the lens barrel there is positioned a multielement lens system. The first element 54 and the second element 56 are fixed lens elements as is the fourth lens element 58. The third lens element is an adjustable lens element which may be moved to effect the adjustment of the focus of the lens system. To this end the third lens element 60 is mounted in a collar 62 which is externally threaded. A sleeve 64 is fixedly mounted within the lens barrel 52 and is internally threaded to make with the threads on the exterior of the collar 62. The upper surface of the collar 52 is provided with a series of longitudinal grooves 56 which constitute a gear sector. A slide plate 68 is arranged to be moved transversely of the axis of the lens barrel 52. At the portion of the slide plate 68 adjacent the lens barrel 52 there is formed a rack of gear teeth 70 which is arranged to engage the grooves or gear teeth on the upper surface of the collar 52. Thus, as the slide plate 68 is moved backward or forward transversely of the lens barrels 52, the engagement of the rack 70 with the gear teeth 66 on the collar 62 causes the collar and the third lens element carried thereby to move axially of the lens system thereby changing the focus adjustment of the lens system.

The slide plate 68 may be caused to move transversely of the lens barrel manually by engaging the knurled member 72 by a finger of the operator. On the other hand, the slide plate 68 may be caused to move transversely of the lens barrel, thereby adjusting the focus of the lens system automatically. To this end, the slide plate 68 carries a second rack 74 which is engaged and driven by a spur gear 76. The spur gear 76 is, in turn, driven by the motor 50 (the same motor used to accomplish a resetting of the shutter mechanism and the advancement of the film to the next film frame position). It is contemplated that the operation of the reversible motor 50 in the one direction, as previously mentioned, effects the resetting of the shutter mechanism and the film advancement function, and when operated in the opposite direction is controlled to effect the automatic focus adjustment of the lens system.

The slide plate 68 also carries a normally open switch 78. It will be noted that the contacts of the switch 78 changed their position as the position of the slide plate, itself, is changed. That is, the position of the switch contact changes in accordance with the focus adjustment of the camera. Means associated with the shutter driving mechanism are provided for actuating or closing the contacts of the switch 78 as the shutter blades are moved toward their open position. This relationship is schematically represented in FIG. 2 as a switch actuator or boss 80 mounted on and carried by a first driving plate 26 (shown in fragmentary form). Again, the structure shown in FIG. 2 is illustrative of the environment to which the circuit of the present invention pertains.

Figure 3:
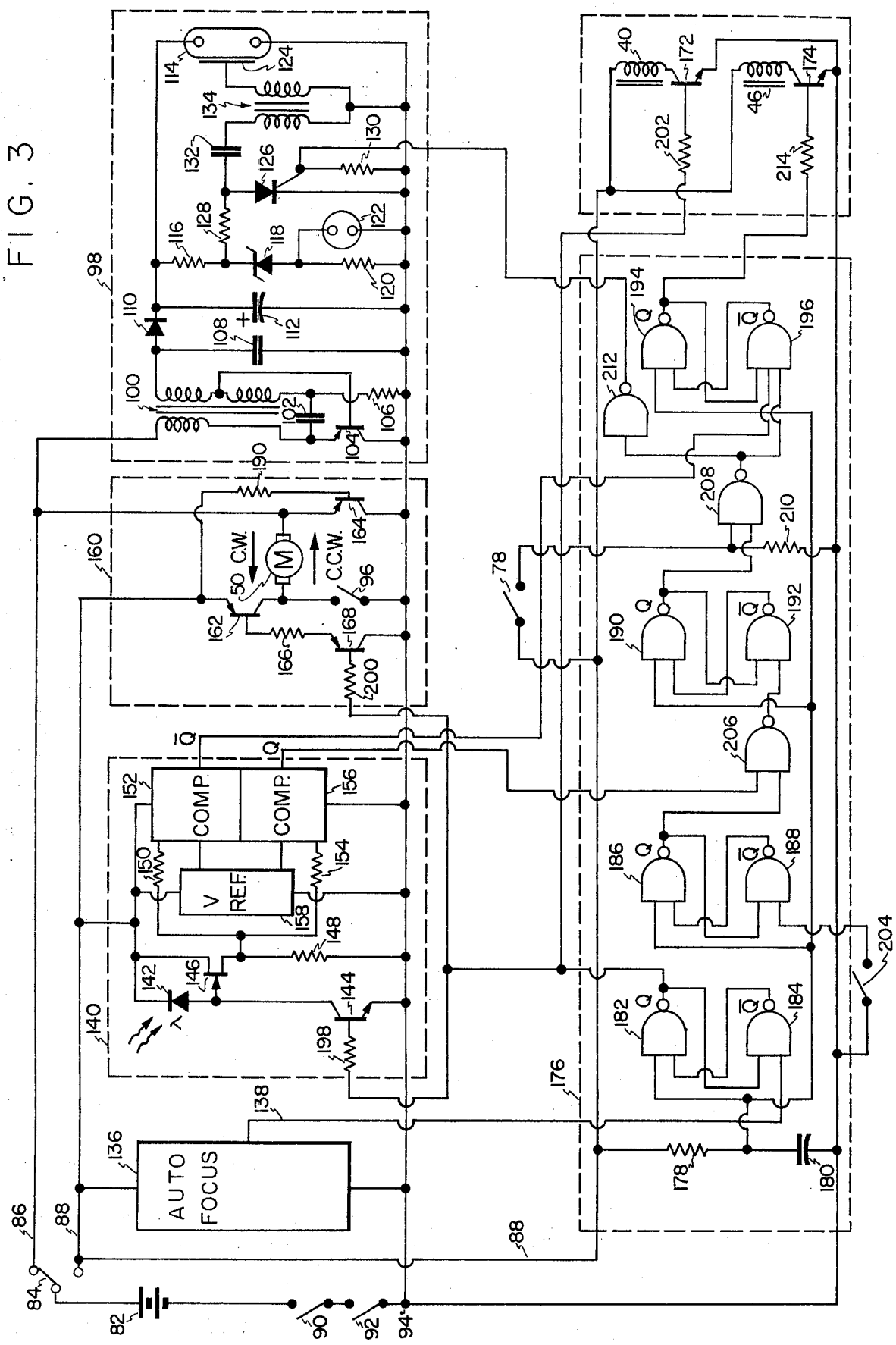
FIG. 3 is a schematic diagram of an electronic control system embodying the present invention.

In FIGS. 3 there is shown an automatic camera control circuit embodying the present invention. Power for the circuit is obtained from a battery 82 the positive terminal of which is connected to the movable blade of a double-pole, single-throw switch 84. The switch 84 is normally closed on a first contact connected to a first positive bus 86. When the switch 84 is actuated, the positive terminal of the battery 82 is connected to a second positive bus 88. The negative terminal of the battery 82 is connected through a first and a second single-pole, single-throw switch 90 and 92, respectively, serially connected, to a negative bus 94. The first positive bus 86 is connected to a first terminal of a reversible motor 50. The second terminal of the motor 50 is connected through a switch 96 to the negative bus 94.

The first positive bus 86 is also connected to energize an electronic flash circit 98. Specifically, the bus 86 is connected to one terminal of the primary of a transformer 100. The transformer 100 is connected, with the capacitor 102, a transistor 104, a resistor 106, and the negative bus 94 in a free-running oscillator configuration. The oscillatory pulses from the aforementioned oscillator are applied by way of a capacitor 108 and a diode 110 to establish a high voltage across a capacitor 112. It will be noted that a flash tube 114 is connected directly across the capacitor 112. Also connected directly across the capacitor 112 is a series circuit comprising a resistor 116, a zener diode 118, and a resistor 120. An indicator lamp such as a neon bulb 122 is connected across the resistor 120. When a predetermined charge has been established on the capacitor 112, the indicator lamp will be illuminated to indicate the readiness of the charging circuit for the flash unit. although the high voltage charge on the capacitor 112 is applied across the electrodes of the flash tube 114, the tube will not produce a flash of light until such time as a trigger pulse has been applied to the trigger electrode 124 thereof. A trigger circuit for the flash unit includes an SCR (silicon controlled reactifier) 126 has its anode connected through a resistor 128 to the junction between the resistor 116 and the zener diode 118. The cathode of the SCR 126 is connected directly to the negative bus 94. The gate electrode of the SCR 126 is connected through a bias resistor 130 to the negative bus 94. The gate electrode is also connected to a control circuit to be described hereinafter. The anode of the SCR 126 is also connected through a capacitor 132 to a primary winding of an autotransformer 134. The secondary winding of the autotransformer 134 is connected directly to the trigger electrode 124 of the flash tube 114.

The second positive bus 88 is connected to one energizing terminal of an autofocus circuit 136, the other energizing terminal of which is connected to the negative bus 94. The specific details of the autofocus circuit are not a part of the present invention and are not shown herein. Any of a number of automatic focus determining circuits are suitable for use herein; the only requirement being that at the point of determination of best focus, a minimum or null signal be applied to the output lead 138.

The second positive bus 88 is also connected to energize an automatic exposure control circuit 140. The other energizing leads of the automatic exposure control circuit 140 are also connected to the negative bus 94. The automatic exposure control circuit includes a photosensitive detector 142 such, for example, as a silicon diode detector. The photosensitive detector 142 has one electrode connected to the positive supply bus 88. The other electrode thereof is connected through the emitter-collector path of a transistor 144 to the negative supply bus 94. The junction between the photosensitive detector 142 and the collector of the transistor 144 is connected to the gate electrode of a field effect transistor (FET) 146. The source electrode of the FET 146 is connected to the positive bus 88; while the drain electrode is connected through a resistor 148 to the negative bus 94. The FET 146 thus comprises an amplifier for the output signal of the photosensitive detector 142. The output terminal, the drain electrode, of the FET 146 is connected through a resistor 150 to one input terminal of a first comparator 152. The same output terminal of the FET 146 is also connected through a second resistor 154 to one input terminal of a second comparator 156. A voltage reference circuit 158 is connected between the positive supply bus 88 and the negative supply bus 94. A first reference voltage from the voltage reference circuit 158 is applied to a second input terminal of the first comparator 152 while a second reference voltage from the voltage reference circuit 158 is applied to a second input terminal of the second comparator 156. The first comparator 152 is so arranged that when the signal applied to the two input terminals is equal, a relatively low or logical "zero" signal appears at the output thereof. On the other hand, the second comparator 156 is so arranged that when the two signals applied to the input thereof are equal, a relatively high or logical 1 appears at the output terminal thereof. It should be noted, at this point, that the reference signal applied to the second terminal of the second comparator 156 is a much lower voltage signal then is the reference signal applied to the second terminal of the first comparator 152. The purpose of these different level voltage reference signal will appear hereinafter.

The positive bus 88 is also connected in energizing relationship to the motor control circuit 160. It will be remembered that for energization of the motor for rotation in one direction, the motor control circuit was connected to the first positive bus 86 with the energization of the motor going from the positive bus 86 through the motor and a closed switch 96 to the negative bus 94. For energization of the motor for operation in the opposite direction, the energizing current flow is from the bus 88 through the emitter-collector path of a transistor 162, through the motor then through the collector-emitter path of a transistor 164. The base electrode of the transistor 162 is connected through a resistor 166 to the collector electrode of a transistor 168 the emitter of the transistor 168 is connected to the negative bus 94. The base of the transistor 154 is connected through a resistor 170 to the positive bus 88. So long as the switch 84 is in contact with the first positive bus 86, the transistor 164 is biased to an "off" condition. Similarly, the transistor 162 is normally bias to an "off" condition until turned on by a signal to be defined hereinafter.

The positive bus 88 is also connected in an energizing relationship with the first and second magnets 40 and 46, respectively, previously referenced in the discussion of FIG. 1. One terminal of the coil of the magnet 40 is connected to the positive supply bus 88. The other terminal of the coil 40 is connected, through the collector-emitter path of a transistor 172, to the negative supply bus 94. Similarly, one terminal of the coil of the magnet 46 is connected to the positive supply bus 88 while the other terminal is connected, through the collector-emitter path of a transistor 174, to the negative supply bus 94.

The interrelationship of the foregoing circuit components is under the control of a logic circuit 176. The logic circuit 176 is brought into operation whenever the switch 84 is closed on the second positive supply bus 88. A resistor 178 and a capacitor 180 are serially connected between the positive supply bus 88 and the negative supply bus 94. That arrangement supplies a positive bias signal at the junction between the resistor 178 and the capacitor 180 to initially "set" a plurality of flip-flop units, as will be described hereinafter. The first of the flip-flop unit comprised of a pair of cross-coupled NAND gates 182 and 184, respectively. A second flip-flop unit is comprised of a second pair of cross-coupled NAND gates 186 and 188, respectively. A third flip-flop unit includes a third path of cross-coupled NAND gates 190 and 192, respectively. A fourth flip-flop unit includes a fourth pair of cross-coupled NAND gates 194 and 196, respectively. The junction between the resistor 178 and the capacitor 180 is connected to one of the input terminals of each of the NAND gates 182, 186, 190 and 194. This connection assures that when the switch 84 is closed on the second positive bus 88 each of the NAND gates 182, 186, 190 and 194 will be controlled to produce a "high" or logical 1 at the output thereof. The output terminal of the first NAND gate 182 is connected to the base electrode of a transistor 144 through a resistor 198. The output terminal of the gate 182 is also connected through a resistor 200 to the base electrode of the transistor 168. That same output terminal is further connected through a resistor 202 to the base electrode of a transistor 172.

In the cross-coupling relationship, the output terminal of the gate 182 is connected to one of the input terminals of the gate 184. In turn, the output terminal of the gate 184 is connected to the other input terminal of the gate 182. The output lead 138 from the autofocus control circuit is connected to the second input terminal of the gate 184. In the cross-coupling relationship, in the second flip-flop unit, the output terminal of the gate 188 is connected to the second input terminal of the gate 186 while the output terminal of the gate 186 is connected to one of the input terminal of the gate 188 is connected through a selectively operated switch 204 to the negative supply bus 94. The output terminal of the gate 186 is connected to one input terminal of a NAND gate 206. The other input terminal of the NAND gate 206 is connected to the output terminal of the second comparator 156.

The output terminal of the gate 206 is connected to one input terminal of the gate 192 forming a part of the third flip-flop unit. The output terminal of the gate 192 is connected to the second input terminal of the gate 190 while the output terminal of the gate 190 is connected to the other input terminal of the gate 192 to complete the cross-coupled relationship. The output terminal of the gate 190 is also connected to one input terminal of a NAND gate 208. The second input terminal of the NAND gate 208 is connected through a resistor 210 to the negative supply bus. The second input terminal of the gate 208 is also connected through a selectively operated switch 78 to the positive supply bus 88. The output terminal of the gate 208 is connected through an inverter 212 to the gate electrode of the SCR 126 in the trigger circuits of he flash unit 98.

The output terminal of the gate 208 is also connected to one of the input terminals of the gate 196 forming part of the fourth flip-flop unit. It will be noted that the gate 136 is a 3 input NAND gate the output terminal of which is connected to the second input terminal of the gate 194. In its cross-coupled relationship the output terminal of the gate 194 is connected to a second input terminal of the gate 196. The third input terminal of the gate 196 is connected to the output terminal of the first comparator 152. The output terminal of the gate 194 is also connected through a resistor 214 to the base electrode of the transistor 174.

MODE OF OPERATION OF THE PREFERRED EMBODIMENT

The switch 92 may be in the form of a conventional on-off switch. On the other hand it may serve the same function by being interlocked with a functional member of the camera such, for example, as a retractable view finder. In the latter case, the switch would be closed whenever the view finder is withdrawn from its retracted position to make the camera ready for use. In either case to render the camera ready for use, the switch 90 would be closed. The switch 92, it is contemplated, will be a safety interlock switch correlated with the operation of a door member which must be opened to insert a film cartridge. The switch 92 will be closed whenver the door to the film cartridge chamber is closed. Both switches must be closed in order to render the circuit operational.

Assume that the switch 90 has been closed either manually or by the actuation of the functional element such as a view finder. The door to the film cartridge chamber is opened for the insertion of a film cartridge. At that time the switch 92 will be opened. When the film cartridge has been inserted and the door closed, the circuit becomes functional. As in substantially all of the cameras designed for use with the so-called easy-load film cartridges, the camera includes a feeler which is positioned to sense the presence or absence of a perforation placed in the edge of the film by the film manufacturer to indicate appropriate film frame positions. The switch 96 is so interlocked with such a feeler that the switch 96 is closed whenever a perforation is not present under the feeler. Accordingly, when the switch 92 is closed after having inserted a cartridge, the switch 96 will also be closed as a result of the absence of a perforation in the film. With the switch 96 closed, current will flow from the first positive supply bus 86 through the motor 50, and to the negative supply bus 94. The current flow through the motor under these conditions will cause the motor to rotate in one predetermined direction. This rotation will be coupled into the camera apparatus to cause the film to be advanced until such time as a perforation is engaged by the feeler, causing the switch 96 to be opened.

At the same time, if the shutter mechanism had not previously been reset to its ready or cocked position, the operation of the motor in this predetermined direction will also cause the shutter mechanism to be so reset.

Simultaneously, the electronic flash unit will be energized, the oscillator 100 will start oscillating thereby charging the capacitor 112 to a predetermined level. When the predetermined level has been reached, the indicator lamp 122 will be lit to indicate that the flash unit is ready for operation. At that point the switch 84, which is coupled to the shutter release button of a camera may be actuated to initiate the taking of a picture.

The actuation of the switch 84 causes the power supply battery 82 to be connected to the second positive bus 88. When the voltage is applied to the positive bus 88, the signal developed at the junction between the resistor 78 and the capacitor 180 in the logic circuit 176 causes the gates 182, 186, 190 and 194 all to be actuated to their "set" condition. That is, a relative high or logical 1 appears at the output terminal of each of those gates. As was previously mentioned, the output of the gate 182 is connected simultaneously to the base electrode of the transistor 144, transistor 168 and transistor 172. The application of the high or logical 1 to the base of the transistor 144 causes that transistor to turn "on" to a conductive condition. While the transistor 144 is conductive, the automatic exposure control circuit is inoperative.

Similarly, the application of the logical 1 to the base of the transistor 168 causes that transistor to be conductive. When the transistor 168 becomes conductive, the transistor 162 becomes conductive. In the meantime the transistor 164 has been rendered conductive simultaneously with the closure of the switch 84 to the positive bus 88. With the transistors 162 and 164 now conductive, current from the bus 88 flows through the motor 50 in the opposite direction from that previously discussed. This causes the motor to be operated in the opposite direction. As was previously mentioned it is contemplated that when the motor is operated in the opposite direction it will be coupled through the gear 76 to the rack 74 to effect an adjustment of the focus of the lens system of the camera, as was discussed in connection with the description of the structure illustrated in FIG. 2. Correlated with the adjustment of the lens system of the camera is the autofocus control circuit 136. When a condition of best focus is obtained through operation of the autofocus system and the automatic adjustment of the lens system, a relatively low or logical 0 is applied to the output lead 138 from the autofocus control circuit. That logical 0 is applied to one of the input terminal of the gate 184 forming a part of the fist flip-flop unit. The application of that logical 0 to the input of the gate 184 causes the flip-flop to change states, producing a relative low or logical 0 at the output of the gate 182. That logical 0 when applied to the base electrode of the transistor 168 causes the transistor 162 to become non-conductive, thereby stopping the operation of the motor 50.

Simultaneously, the logical 0 from the output terminal of the gate 182 is applied to the base electrode of the transistor 172, rendering that transistor non-conductive, de-energizing the magnet 40 thereby allowing the shutter mechanism to begin to open.

At the same time, the logical 0 from the output of the gate 182 is also applied to the base electrode of the transistor 144 rendering that transistor non-conductive. When the transistor 144 is rendered non-conductive, the exposure control circuit 140 becomes operative.

It was previously mentioned that it is contemplated that the photosensitive detector 142 will be located in the camera chamber between the shutter and the film frame. Therefore, as the shutter mechanism begins to open, light is admitted to the chamber and falls on the photosensitive detector 142. In the preferred embodiment of the present invention, the photosensitive detector is of a type which provides self-integration. A silicon photocell is a detector of the type which will provide such self-integration for a time period sufficient for the purposes of this invention. The output signal from the photosensitive detector 142 is amplified by the FET 146 and compared separately with the two reference signals from the voltage reference source 158. Again as was previously mentioned, the reference signal applied to the second comparator 156 is a relatively low valued signal. The output terminal of the comparator 156 is connected to one of the input terminals of the gate 206. The other input terminal of the gate 206 is connected to the output terminal of the gate 186 in the second flip-flop unit. Initially, the second flip-flop unit is in its "set" condition with a logical 1 appearing at the output of the gate 186. That logical 1 is applied as one of the input signals to the gate 206. Until such time as the signal from the photosensitive detector reaches a point of equivalance with the reference voltage applied to the input of the second comparator 156, the output of the voltage comparator 156 is a relatively low or logical 0. That logical 0 is applied as the other input signal to the gate 206. Consequently, the output of the gate 206 is a relatively high or logical 1, which is applied as one of the input signals to the gate 192 of the third flip-flop unit. The third flip-flop unit has also been established in its "set" condition with a logical 1 appearing at the output of the gate 190. That logical 1 applied to one of the input terminals of the gate 208 together with the logical 0 applied to the other input terminal thereof produces a logical 1 at the output of the gate 208. The logical 1 at the output of the gate 208 is inverted by the inverter 212 to produce alogical 0 at the trigger electrode of the SCR 126 in the electronic flash unit 98.

At this point it might be noted that when the switch 84 was switched from contact with the bus 86 to effect a contact with the bus 88, the oscillator of the electronic flash unit would be deenergized. The deenergization of the oscillator in the electronic flash unit 98 reduces any possibility of the oscillator signal producing a spurious or noise signal in any of the other circuit components during subsequent operation. Notwithstanding the deenergization of the oscillator, the high voltage charge remains stored on the capacitor 112.

The switch 204 connected to one of the input terminals of the gate 188 of the second flip-flop unit is normally opened. However, that switch is correlated with the movement of the shutter blades such that very shortly after the shutter begins to open, for example, when the opening has reached a condition equivalent to a stop of $f/11$, the switch will be closed. When the switch 204 is closed, a relative low or logical 0 is applied to the input terminal of the gate 188, causing the second flip-flop unit to change its state to produce a relative low or logical 0 at the output of the gate 186. If, before the switch 204 is actuated, the signal from the photosensitive detector has reached a level which is equal to or greater than the reference signal applied to the comparator 156, the output signal from the comparator 156 will be switched to a relative high or logical 1. That logical 1 applied to the input of the gate 206 causes that gate to produce an output signal which is a logical 0. The logical 0 from the gate 206 applied as an input to the third flip-flop unit causes that flip-flop unit to change its state to produce a logical 0 at the output of the gate 190. That logical 0 applied to the input of the gate 208 maintains the output of that gate at a logical 1 which, in turn, holds the logical 0 at the trigger electrode of the SCR 126 in the electronic flash circuit 98. When, subsequently, the switch 204 is closed causing the second flip-flop unit to change its state to produce a logical 0 at the output of the state 186, the gate 206 will change its gate to produce a logical 1 at its output. That logical 1 applied to the input of the gate 192 will not, however, cause the second flip-flop unit to change its state. Therefore, a logical 0 will be applied from the output of the gate 190 to one input to the gate 208.

It will be remembered that the switch 78 is also correlated with the movement of the shutter mechanism and is positionally adjusted in accordance with the adjustment of the focus system. When during a later stage in the opening of the shutter, the switch 78 is closed, a high or logical 1 signal is applied to the other input terminal of the gate 208. Since the output of the gate 190 had been switched to a logical 0, the gate 208 is disabled and does not respond to the closure of the switch 78 to cause a change in its output state. Therefore the output of the inverter 212 remains at a low or logical 0 and the electronic flash unit is not fired. Therefore it can be seen that the value of the reference signal applied to the input of the comparator 156 is such a value that when the scene brightness, as determined by the light sampling at a shutter opening of $f/11$, is sufficient to produce a proper exposure of the film in the camera within the time frame suitable for hand-held cameras (1/30 of a second) the electronic flash unit will not be fired.

On the other hand, if the switch 204 were to be closed before the comparator 156 changed its output from a logical 1to a logical 0, a different situation would exist. The closure of the switch 204 causes the second flip-flop unit to change its state to produce a logical 0 at the output of the gate 186. That logical 0 applied to the input of the gate 206 does not change the state of the output of the gate 206; nor will the subsequent switch of the output of the comparator 156 from a logical 0 to a logical 1 change the output state of the gate 206. Therefore the condition of the third flip-flop is not changed and a logical 1 is still applied from the output terminal of the gate 190 to one of the input terminals of the gate 208. This relationship indicates that the scene brightness, as sampled at $f/11$, is not sufficient to produce an adequate exposure of a film in the camera within the alloted time frame. Therefore, a subsequent closure of the switch 78 applies a logical 1 to the other input of the gate 208, causing the state of that gate to switch to produce a logical 0 output, That signal, inverted by the inverter 212, produces a logical 1 or a high signal applied to the trigger electrode of the SCR 126 in the electronic flash unit 98. The application of that logical 1 or high signal to the trigger electrode of the SCR 126 causes the SCR 126 to become suddenly conductive, dumping the charge on the capacitor 132 and producing a triggering signal across the transformer 134 to the trigger electrode 124 of the flash tube 114, thereby initiating a flash discharge through the tube 114.

The fourth flip-flop unit had also been established in its "set" condition with a logical 1 at the output terminal of the gate 194. That logical 1 when applied to the base electrode of the transistor 174 maintains the magnet 46 in an energized condition. It will be noted that in the fourth flip-flop unit the gate 196 is a three input gate. In the initial condition a logical 1 is applied to each of the three input terminals of the gate 196. When the gate 208 was caused to change its state to produce a logical 0 at its output, that logical 0 causes the fourth flip-flop unit to change its state to produce a logical 0 at the output of the gate 194. The logical 0 at the output of the gate 194, when applied to the base electrode of a transistor 174, renders the transistor 174 nonconductive, de-energizing the magnet 46, thereby releasing the second driving plate 28 of the shutter mechanism and allowing the shutter mechanism to close.

If, on the other hand, the scene brightness, as sampled by the photosensitive detector at $f/11$, was sufficient to allow a proper exposure of the film in the camera within the alotted time frame, as hereinbefore noted, the gate 208 will not have changed its state when the switch 78 is closed. Under those conditions, the magnet 46 remains energized, holding the shutter mechanism in the open or opening condition. In the meantime, the photosensitive detector 146 continues to integrate the light admitted through the shutter opening until such time as the magnitude of the signal from the FET amplifier 146 is equal to the magnitude of the reference voltage applied to the comparator 152. When the equality has been reached, the output signal from the comparator 152 switches from a logical 1 to a logical 0. That logical 0 is applied directly to one of the input terminals of the gate 196 of the fourth flip-flop unit. That logical 0 also causes the fourth flip-flop unit to change its state to produce a logical 0 at the output of the gate 194, rendering the transistor 174 nonconductive, de-energizing the magnet 46, and allowing the shutter mechanism to close. Thus it may be seen that the magnitude of the reference voltage applied to the comparator 152 is such as to indicate that sufficient light has been admitted through the shutter opening to effect a proper exposure of the film within the camera.

After completion of the exposure, the returning movement of the second driving plate 28 causes the switch 96 to be again closed. Also coincident with the completion of the exposure of the film in the camera to produce a photograph, the operator of the camera would release his finger from the shutter release button, thereby allowing the switch 84 to return to its initial position in engagement with the first positive bus 86. With the switch 84 closed on the positive bus 86, the returning movement of the driving plate 28 causing a closure of the switch 96, again establishes an energization of the motor 50 in the first mentioned direction. The shutter mechanism is thereby reset to its ready or cocked condition and the film in the cartridge is advanced to the next film frame position. Simultaneously, the oscillator in the electronic flash unit is again energized and the capacitor 112 recharged in readiness for a subsequent flash.

DETAILED DESCRIPTION OF THE SECOND EMBODIMENT

Figure 4:
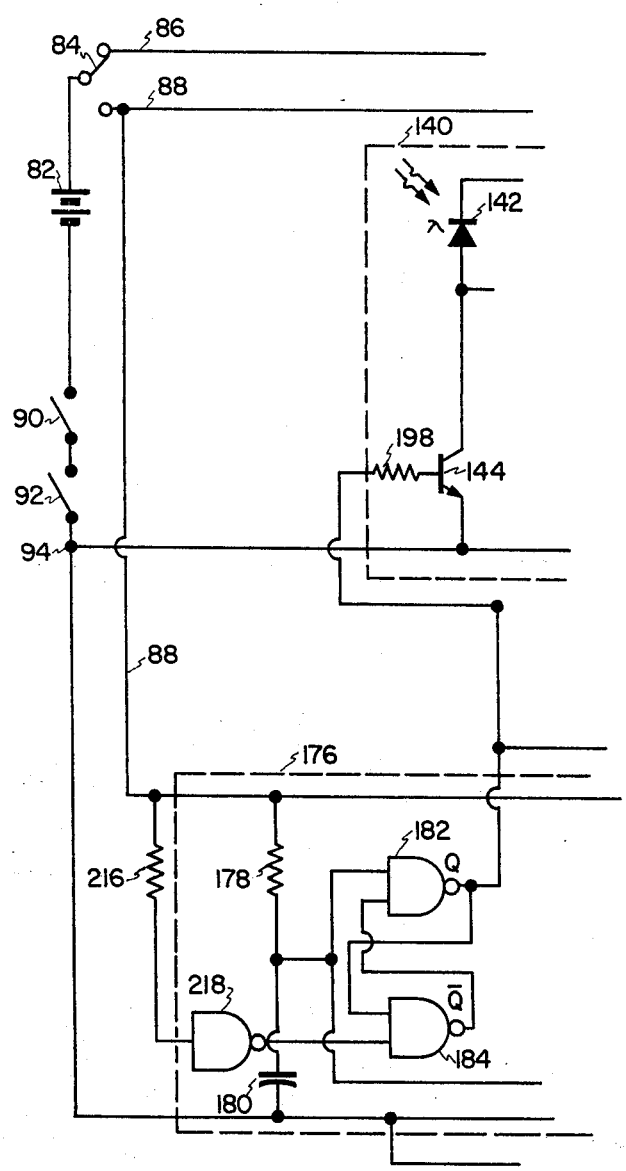
FIG. 4 is a schematic diagram of a portion of an electronic control system also embodying the present invention.

In FIG. 4 there is shown a somewhat modified circuit. If, in the circuit of FIG. 3 there were no provision for the automatic focus control circuit, there would be no way of turning "off" the transistor 144 to allow the automatic exposure control circuit 140 to begin operating. Accordingly, the embodiment shown in FIG. 4 does not include an autofocus circuit. Instead, the second positive bus 88 is connected through a resistor 216 to the input terminal of an inverter 218. The output of the inverter 218 is applied to the control input terminal of the gate 184.

Without the automatic focus feature, the camera lens would be manually adjusted, as by manual adjustment of the slide plate 68 (FIG. 2) before the shutter release mechanism is actuated. Thus, there would be no need to effect a time delay before the shutter mechanism and the automatic exposure means is put into operation. Accordingly, when the shutter release button is actuated by the camera operator, the switch 84 is again moved from engagement with the first positive bus 86 to engagement with the second positive bus 88. As soon as the positive potential from the battery 82 is applied the output of the gate 182 of the first flip-flop unit is driven to a "low" or logical 0. The application of that logical 0 to the base of the transistor 144, causes that transistor to become non-conductive, thereby allowing the automatic exposure control circuit 140 to be operative.

At the same time, the logical 0 from the gate 182 is applied to the base electrode of the transistor 172, de-energizing the first magnet 40. The de-energization of the magnet 40 allows the shutter mechanism to begin to open. From there on out, the operation of the control circuit is the same as that set forth in the discussion of the circuit of FIG. 3.

It will, of course, be appreciated that, if the automatic focus feature is not included in the camera, there will be no need for the control circuit controlling the operation of the motor 50 in the 37 autofocus" direction, shown in FIG. 3 as counter clockwise. Therefore, without the automatic feature, transistors 162, 164 and 168, their associated circuitry and their functions would be deleted from the circuit shown in FIG. 3.

Thus, it may be seen that there has been provided, in accordance with the present invention, an automatic control circuit for an automatic camera, the circuit providing control of the timing and sequential coordination of the several automatic features of the camera.

The embodiments of the invention in which an exclusive property or privilege is claimed are defined as follows:

1. In an automatic photographic camera featuring a plurality of automatic functions, a control system for controlling the sequence and actuation of said automatic functions, said control system comprising:
   means for producing a plurality of parametric signals representative of parameters related to said automatic functions,
   a binary logic control circuit responsive to said parametric signals for producing a plurality of control signals,
   said binary logic control circuit including means for establishing the selection and sequence of the actuation of said automatic functions,
   means responsive to said control signals to effect the actuation of said automatic functions,
   said control system including an automatic exposure control means for controlling the operation of the shutter of said camera,
   said control means including an integrating light sensing means,
   voltage reference means,
   signal comparator means connected to said light sensing means and to said voltage reference means for producing one of said parametric signals as a function of the comparison of the outputs of said voltage reference means and said light sensing means,
   said binary logic control circuit including gating means responsive to said one parametric signal for controlling the operation of the shutter of said camera,
   said automatic functions including an automatically controlled electronic flash means, said automatic exposure control means including means for sampling the ambient light at a point in time early in the opening phase of the shutter of said camera,
   means for producing a further parametric signal representative of the result of the sampling of said ambient light, and
   said binary logic control circuit includes means responsive to said further parametric signal to control the actuation of said electronic flash means, in accordance with the value of its ambient light whereby said electronic flash means is actuated to produce a flash whenever said ambient light is below a predetermined value and to block the actuation of said electronic flash means whenever the ambient light is above said predetermined value.

2. In an automatic photographic camera featuring a plurality of automatic functions, a control system for controlling the sequence and actuation of said automatic functions, said control system comprising:
   means for producing a plurality of parametric signals representative of parameters related to said automatic functions,
   a binary logic control circuit responsive to said parametric signals for producing a plurality of control signals,
   said binary logic control circuit including means for establishing the selection and sequence of the actuation of said automatic functions,
   means responsive to said control signals to effect the actuation of said automatic functions,
   said control system including an automatic exposure control means for controlling the operation of the shutter of said camera,
   said control means including an integrating light sensing means,
   voltage reference means,
   signal comparator means connected to said light sensing means and to said voltage reference means for producing one of said parametric signals as a function of the comparison of said voltage reference means and said light sensing means, said binary logic control circuit including gating means responsive to said one parametric signal for controlling the operation of the shutter of said camera, said control system further including focus control means for automatically adjusting the focus of the lens system of said camera, said focus control means including an electric motor for driving the adjusting means for said lens system, and means correlated with the lens system for producing a focus related parametric signal representative of the condition of focus of said lens system, said binary logic control circuit including means responsive to said focus related parametric signal for controlling the energization of said electric motor whereby to deenergize said motor when a condition of best focus is indicated by said focus related parametric signal.

3. The control system as set forth in claim 2 wherein said binary logic control circuit includes further means responsive to said focus related parametric signal to block the initiation of others of said automatic functions until the completion of said automatic focus adjustments.

4. In an automatic camera featuring a plurality of automatic functions, a control system for controlling the sequence and actuation of said automatic functions, said control system including means for producing a plurality of signals representative of parameters relating to the operation of said camera, control circuit means responsive to said signals for producing a plurality of control signals, said automatic functions including focussing control, exposure control and electronic flash producing means, and means connected to be responsive to said cntrol signals for effecting adjustment of the focus of said camera, for effecting said automatic exposure control of said camera in accordance with the illumination of a scene to be photographed, and for effecting the control of the actuation of said electronic flash producing means in accordance with the value of the ambient light whereby said electronic flash producing means is enabled to produce a flash whenever the ambient light is below a predetermined value and to timely actuate said flash producing means.

5. The control system as set forth in claim 4 wherein one of said control signals is effective to block the actuation of said electronic flash producing means when the ambient light is above said predetermined value.

6. The control system as set forth in claim 4 wherein said camera includes means for resetting said automatic functions preparatory to a new photographic cycle, and wherein said control circuit includes means for completing the sequence of photographic operations comprising means for effecting the actuation of said means for resetting said automatic functions.

* * * * *

UNITED STATES PATENT OFFICE
CERTIFICATE OF CORRECTION

PATENT NO. : 3,917,395
DATED : November 4, 1975
INVENTOR(S) : FRANCIS T. OGAWA

It is certified that error appears in the above-identified patent and that said Letters Patent are hereby corrected as shown below:

Correct the references cited to indicate the following:

| | | | |
|---|---|---|---|
| 3,591,829 | 7/1971 | Murata et al | 95/10X |
| 3,604,330 | 9/1971 | Fahlenberg et al | 95/53 |
| 3,659,509 | 5/1972 | Burgarella | 354/33 |
| 3,699,861 | 10/1972 | Burgarella et al | 95/100X |
| 3,742,826 | 7/1973 | Kahtane | 95/10 |
| 3,744,385 | 7/1973 | Burgarella et al | 354/60 |
| 3,820,128 | 6/1974 | Burgarella et al | 354/32 |

Signed and Sealed this twenty-sixth Day of July 1977

[SEAL]

Attest:

RUTH C. MASON
Attesting Officer

C. MARSHALL DANN
Commissioner of Patents and Trademarks